United States Patent [19]

Hutt et al.

[11] Patent Number: 4,816,309

[45] Date of Patent: Mar. 28, 1989

[54] HEAT-RECOVERABLE FABRIC ARTICLE

[75] Inventors: Norman Hutt, Swindon; Winfield P. Roland, Latton, nr Swindon, both of United Kingdom

[73] Assignee: Raychem Corporation, Menlo Park, Calif.

[21] Appl. No.: 104,709

[22] Filed: Oct. 2, 1987

[30] Foreign Application Priority Data

Oct. 23, 1986 [GB] United Kingdom ............ 8625369

[51] Int. Cl.$^4$ .................. B32B 1/00; B32B 27/12; B32B 27/32; B32B 31/28; H02G 15/18
[52] U.S. Cl. .................................. 428/34.5; 156/49; 156/52; 156/82; 156/86; 156/215; 156/273.3; 156/273.7; 156/275.5; 156/307.7; 156/324.4; 174/DIG. 8; 427/36; 427/331; 427/412; 428/229; 428/246; 428/247; 428/251; 428/252; 428/253; 428/254; 428/255; 428/257; 428/259; 428/332; 428/345; 428/349; 428/351; 428/354; 428/913; 428/34.9

[58] Field of Search ............... 156/215, 273, 3, 273.7, 156/275.5, 307.7; 174/DIG. 8; 427/36, 331, 412; 428/36, 229, 246, 247, 251, 252, 253, 254, 255, 257, 259, 332, 345, 349, 351, 354, 913

[56] References Cited

FOREIGN PATENT DOCUMENTS

| 116393 | 8/1984 | European Pat. Off. . |
|---|---|---|
| 116390 | 8/1984 | European Pat. Off. . |
| 0175554 | 3/1986 | European Pat. Off. . |
| 1497051 | 1/1978 | United Kingdom . |
| 2135836 | 9/1984 | United Kingdom . |

Primary Examiner—James C. Cannon
Attorney, Agent, or Firm—A. Stephen Zavell; Herbert G. Burkard

[57] ABSTRACT

A composite material comprising a recoverable fabric and a polymeric matrix material may be recovered around a cable splice to protect it. The fabric may have multifilament glass fibres in one direction which may be provided with a continuous coating to prevent moisture that may travel along their length from travelling through the thickness of the composite.

22 Claims, 1 Drawing Sheet

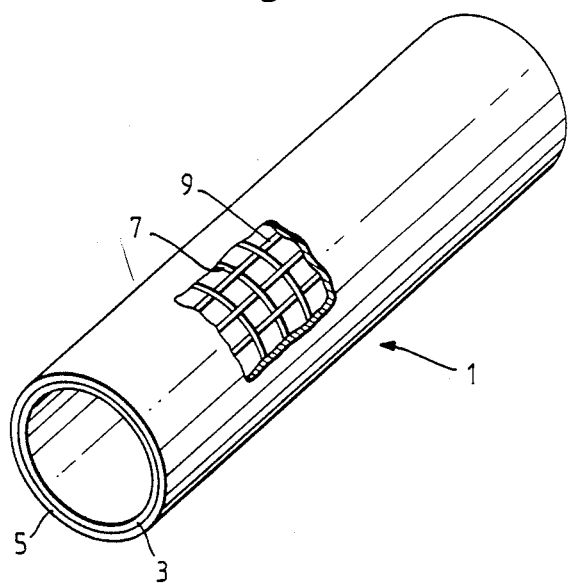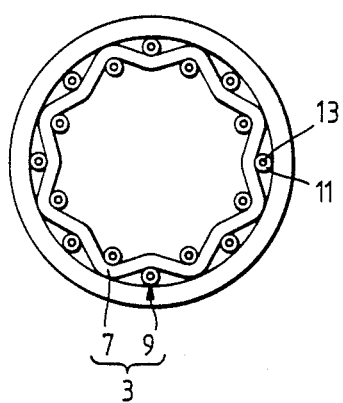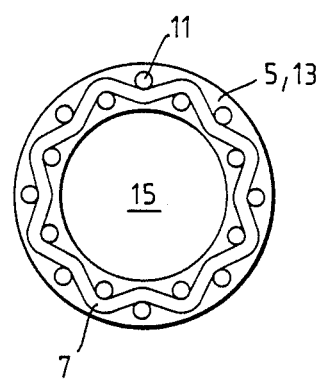

HEAT-RECOVERABLE FABRIC ARTICLE

FIELD OF THE INVENTION

This invention relates to a heat recoverable fabric article which comprises at least one set of fibres that are coated with a layer of polymeric material.

BACKGROUND OF THE INVENTION

By a heat recoverable article is meant an article whose dimensional configuration may be made to change when subjected to appropriate treatment. Usually these articles recover to an original shape from which they have previously been deformed, but the term "recoverable", as used herein, also includes an article which adopts a new configuration, even if it has not been previously deformed.

Heat recoverable articles which are based on fabrics are described in the following patent publications and copending applications: U.S. Pat. No. 3669157 (Carolina Narrow Fabric), European patent application publication Nos. 0116393 (MP0790), 0116391 (RK169), 0117026 (RK176), 0115905 (RK177), 0116392 (RK178), 0116390 (RK179), 0117025 (RK181), 0118260 (RK189), 0137648 (RK205), 0153823 (RK228), 0175554 (RK246), European patent application No. 86303767.7 (RK273), British patent application Nos. 8528966 (RK289), 8610813 (RK296), 8529800 (B118) and U.S. patent application No. 821662 (B121). The disclosure of those applications are incorporated herein by reference. The manufacture of heat recoverable articles from fabrics containing heat recoverable fibres has a number of advantages as compared with conventional heat-shrinkable products including ease of manufacture, since no subsequent expansion step is necessary, improved mechanical properties such as tensile strength, abrasion resistance and split resistance, and the ability to introduce very high strength heat stable fibres into the articles, all of which enable heat recoverable fabrics to be employed in fields hitherto considered inappropriate for heat shrinkable products.

Europeant patent application No. 0175554 (RK246) describes a heat recoverable fabric which can be used for electrical screening. For such an application the fabric comprises conductive fibres, or fibres coated with a conductive material. Aluminium coating is preferred, but a conductive polymer coating may also be used.

The heat recoverable fabrics described in the prior art have many applications, for example covering, mechanically protecting, electrically screening and environmentally sealing objects enclosed by the fabric. For many of those applications it is particularly desirable for the fabric to provide an enclosure which is impervious to the ingress of water, moisture or other liquid. An example of such an application is where the fabric is to provide an enclosure for a splice between electrical cables for example telecommunication cables. In such applications, presence of water may cause an electrical short circuit, and consequent signal distortion. In the heat recoverable fabric materials described in the prior art imperviousness is typically achieved by using a polymeric material in conjunction with, bonded to, or extending throughout the recoverable fabric. That polymeric material is typically applied as a laminate layer on one or both sides of the fabric, or as a matrix through which the fibre extends. The prior art fabrics preferably have finite thickness of polymeric material on each side of the fabric.

SUMMARY OF THE INVENTION

The lamination or impregnation of the heat recoverable fabric with polymeric material substantially prevents penetration of water, moisture or other liquids through the thickness of the article. However, it should be noted that polymeric materials do have a positive, if small, moisture vapour transmission value, and that a small amount of moisture permeation does occur. For this reason the polymeric laminate or matrix material is said substantially to prevent liquid ingress through the thickness of the sleeve.

More significant, water moisture, or other liquid ingress into an article may occur through passage along the fibres of the fabric themselves. This may occur, for example if the fabric used is one which includes the fibres which can themselves transmit water or moisture or other liquid along their length, if the fabric construction is such that a free end of a fibre is accessible to the liquid and the fabric is exposed to the interior of the article. If the fabric article is for example a tube which has a layer of polymeric material inside the fabric, passage of liquid along the fibres will not be a problem, since the liquid will not be able to pass into the interior of the article to any significant extent, since its path will be blocked by the polymeric material. However if the fabric is laminated with the polymeric material only on the outside of the tubular article, or if that part of the polymeric material on the inside of the fabric is damaged or punctured in some way, the fabric will be exposed to the interior of the article, and water passing along the fibres may enter the article. An example where such ingress may occur is in a tubular recoverable fabric sleeve containing glass fibres, where the glass extends from end to end of the tube, and the fabric is laminated only on the outside surface of the article with polymeric material. Water may enter the interior of the tubular article, by entering first the free end of a glass fibre, then migrating along the length of the fibre, from which it may then pass into the interior or the enclosure.

We have discovered a new construction of fabric article which substantially prevents passage of liquid through the thickness of the article, and also substantially prevents any liquid which is travelling along fibres of the fabric from passing out of the fabric. This is achieved by providing a fabric which has a continuous coating of polymeric material on those fibres along which liquid may migrate, and which have one or more ends accessible to liquid. The article also comprises a second polymeric material applied to the fabric, to render the fabric substantially impervious to the passage of liquid through the thickness of the fabric.

Since some of these fibres are coated, it is possible to use, as the core, materials that are incompatible with the second polymeric material applied to the fabric. Thus it is possible to use a broad range of combinations of materials for the core of the coated fibres and the second polymeric material.

The present invention provides a heat recoverable article comprising:

(a) a fabric cover comprising (i) a first set of fibres which are heat recoverable, and (ii) a second set of fibres, at least some of which are, individually, provided with a substantially continuous coating of a non-conductive polymeric material, and (b) a second polymeric material applied to the fabric, to render the article substantially impervious to the passage of liquid through the thickness of the article.

As used herein, the term "fibres" includes monofilaments as well as multifilament yarns, and in the preferred articles at least the heat-shrinkable fibres will be in the form of monofilaments. The term includes tapes, including embossed tapes and fibrillated tapes.

The article of the invention may be made suitable for enclosing objects, for example elongate objects such as pipes or cables.

DESCRIPTION OF THE INVENTION

In one preferred embodiment the fabric cover and hence the article is in the shape of a tube. In this case passage of liquid into the interior of the tube either through the thickness of the article or from either end of the tubular article is substantially prevented.

The first set of fibres are heat recoverable. Preferred forms of the heat recoverable fibres are described in the British patent applications mentioned above. The heat recoverable fibres are preferably formed from a polymeric material that imparts good physical properties and good creep resistance to the fibres. Olefin polymers such as polyethylene and ethylene copolymers, polyamides, polyesters, acrylic polymers and other polymers capable of being cross-linked may be employed. A particularly preferred polymeric material for the fibres is based on polyethylene having a density of from 0.94 to 0.97/g/cc, and Mw of from $80 \times 10^3$ to $200 \times 10^3$ and an Mn of from $15 \times 10^3$ to $30 \times 10^3$.

The heat recoverable fibres preferably have a minimum recovery stress of $10^{-1}$ MPa, more preferably $5 \times 10^{-1}$ and usually at least 1 MPa at a temperature above the transition temperature of the fibres. There is in theory no upper limit of recovery stress, but in practice 200 MPa and more usually 100 MPa is the highest figure normally achievable with polymeric fibres. The tensile strength of the fibres at their recovery temperature is preferably increased to 0.1 MPa or higher by cross-linking the polymeric material from which they are formed, either by chemical means or by irradiation e.g. high energy electron irradiation, gamma radiation or by ultra violet radiation.

When the fibre is cross-linked by irradiation this may be done at any suitable stage. As one example the cross-linking step can be incorporated into manufacture of the fibre. The fibre can be extruded, stretched at a temperature below its melting temperature, preferably by an amount of from 400 to 2000%, then subjected to irradiation to effect cross-linking. Alternatively, the fibre can be extruded irradiated to cross-link, heated, stretched and then cooled. High density polyethylene fibres are preferably irradiated with a dose of from about 5 to about 35 megarads, preferably from about 5 to about 25 megarads, and in particular from about 7 to about 18 megarads. Usually the gel content of the cross-linked fibre is greater than 20%, preferably greater than 30%, most preferably greater than 40%. In practice, gel contents greater than 90% are not easily achievable. As another example the fibre can be extruded, stretched at a temperature below its melting point, incorporated into a fabric and then irradiated.

Although it is usually preferred for the heat recoverable fibres to exhibit a recovery of at least 20%, and especially at least 40%, in certain instances, for example where the article is intended to have a very high pressure retention capability, it may be desirable to employ heat recoverable fibres of relatively low recovery ratio, e.g. as low as 5% recovery.

The second set of fibres are preferably heat stable. By a heat stable article is meant an article which, unlike a heat recoverable article, does not change its configuration when heated, until it changes phase. Preferably the fabric is one, preferably a weave, in which the heat recoverable fibres extend in one direction and the dimensionally heat-stable fibres in another direction so that the fabric as a whole is recoverable in a single direction only.

For many applications where the article is in the shape of a tube, or is a wraparound cover which can be wrapped into the shape of a tube, it is desirable for the heat recoverable fibres to extend around the circumference of the article, and the heat stable fibres to extend along the length of the article. This means that the article will be radially recoverable, but will not change significantly in length when recovered. Preferably the heat stable fibres extending along the length of the article have high axial strength, and thereby impart good axial strength to the finished article.

The second set of fibres are coated with a polymeric material. As examples of materials that may be used for the core of the second set of fibres there may be mentioned glass, synthetic polymeric materials, for example, polyarimids, and natural fibres, for example cotton.

The polymer coating on the second set of fibres substantially prevents any liquid migrating along the core of the fibre passing out of the fibre, and for a tubular article prevents any liquid entering the interior of the article. The coating must be of sufficient strength and thickness to prevent leakage of any migrating liquid through the coating and also to prevent damage to the coating, particularly any damage which would expose the underlying fibre core. Preferably the tensile strength of the coating is at least 5 MPa. Preferably the thickness of the coating is at least 0.05 mm, more preferably at least 0.1 mm. The coating is preferbly flexible, to enable the fibre to be easily fabricated into a fabric. The coating is preferably also sufficiently strong and tough to prevent it being damaged during manufacture of the article or installation of the article. This is particularly important when only a single laminate layer is used, and the coated fibres are exposed.

The fabric can be woven in a pattern, for example, twill, satin, sateen, Leno, plain, hop sack, sack, matt and various weave combinations in single or multiple ply weaves e.g. 2- or 3-ply weaves. Weaves, knits and braids can be used, although weaves and knits are most preferred. For some applications, particularly where good abrasion resistance of the article is desired, it is preferred to use a twill design. This gives an undulating surface to the article, with consequential good abrasion resistance.

The article according to the invention comprises a second polymeric material which is applied to the fabric to render it substantially impervious to the passage of liquid through the thickness of the fabric. The second polymeric material may be either in the form of a layer or layers applied to one or both surfaces of the fabric, or in the form of a matrix through which the fabric extends.

Preferably the second polymeric material is in the form of a single laminate layer, preferably applied to the outer surface of the fabric. An advantage of the present invention is that it allows a single laminate layer of polymeric material to be used outside the article rather than a laminate on both sides, or a matrix extending through the fabric. Where a double laminate on both sides of the fabric is used, or a matrix, the inner laminate layer or that part of the matrix inside the fabric substantially prevents any water which is migrating along the fibres of the fabric passing into the interior of the article. However when the polymeric material is only a single layer, on the outside of the article, such water ingress can occur.

Where the second polymeric material comprises only a single laminate layer, it is important for many applications that the coating on the fibres is non conductive. The coating on the fibres in such cases is exposed, and in applications where it may come into contact with electrical parts, for example where the article is for enclosing a splice between electrical components, it is important that the coating on the fibres is non-conductive to avoid an electrical short.

The use of a single laminate layer of polymeric material rather than a double layer or a matrix is preferred for a number of reasons. For example the overall article is lower in weight. Also a fabric article laminated on only one side has been found to be capable of achieving higher recovery ratios than an equivalent fabric which is laminated on both sides or impregnated with a matrix. Without limiting the invention in any way, this is thought to be because when there is a double laminate layer or a matrix, the polymeric material tends to block the interstices of the fabric and thereby hinder recovery. Preferred embodiments of the article according to the invention have a recovery ratio in the range 1.1:1 to 6:1.

Preferably the second polymeric material is one which has an elongation/temperature profile such that there exists a temperature (t) which is at or above the recovery temperature of the fibres at which temperature the second polymeric material has an elongation to break of greater than 20% and a 20% secant modulus (X) of at least $10^{-2}$ MPa (measured at a strain rate of 300% per minute), and at which temperature the inequality (1) is satisfied:

$$\frac{X}{Y} \cdot \frac{(1-R)}{R} \text{ is less than one} \quad (1)$$

wherein R is the mean effective volume fraction of heat recoverable fibres in the composite structure along the or each direction of recovery based on the total volume of heat recoverable fibres and the second polymeric material. A suitable material for the second polymeric material is described in European patent publication No. 0116393 (MP0790) the disclosure of which is incorporated herein by reference.

The heat recoverable fabric is preferably bonded to, and preferably partially embedded in the second polymeric material. In this embodiment the fabric is partially exposed. Where the article is tubular the fabric may be partially exposed to the interior of the article.

At or above the recovery temperature of the fibres the second polymeric material is preferably capable of limited flow under pressure. It preferably has, at the aforesaid temperature, an elongation to break of greater than 50%, most preferably greater than 100%, and a 20% secant modulus of preferably at least $5 \times 10^{-2}$ MPa, most preferably at least $10^{-1}$ MPa, measured at a strain rate of 300% per minute.

The ability of the second polymeric material to flow when heated need not necessarily apply after recovery. Thus, for example, the second polymeric material may eventually cure to a thermoset on heating, although it is preferred that the cure rate is sufficiently slow under the recovery conditions not to cause the material to drip off the fabric during the recovery of the fibres. Thus, for example, the second polymeric material may contain grafted hydrolysable silane groups which are capable of cross-linking the material subsequently in the presence of moisture. Examples of such materials are given in U.S. Pat. No. 1,286,460 to Dow Corning Ltd., the disclosures of which are incorporated herein by reference. Alternatively the second polymeric material may include a polymer, preferably a rubber and especially an acrylic rubber, which contains epoxy groups and a room temperature insoluble curing agent e.g. dicyandiamide.

Preferably the material of the second polymeric material is chemically and/or physically compatible with the polymeric coating on the second set of fibres of the fabric. Similar compatability is also preferred between the second polymeric material and the heat recoverable fibres. More preferably there is compatability between the second polymeric material applied to the fabric, the polymeric material of the heat recoverable fibres and the polymeric coating on the second set of fibres. By compatability of polymers we mean that they be of similar or identical chemical types and their relevant physical properties during lamination, installation and use be similar or identical. In particular we prefer that the second polymeric material applied to the fabric and the polymeric material coating the second set of fibres are identical, preferably low density polyethylene, and that the heat recoverable fibres are high density polyethylene. The skilled man will be able to choose other combinations of compatible materials.

It is particularly desirable to have good compatibility when only a single laminate layer is used, otherwise there may be disbonding between the fabric and the laminate layer. When a double laminate layer is used, one on either side of the fabric, the polymeric layers may bond to each other through the interstices of the fabric and it is less important that there is good compatability, although it is still desirable. Similarly when a matrix is used.

When the second polymeric material is applied to the fabric as a laminate layer, especially a single laminate layer, the compatibility between (a) the second polymeric material and (b) the coating on the fibres and/or the recoverable fibres is preferably such that the adhesive peel strength between the laminate layer and the fabric is at least 10N/25 mm width measured at 23° C., to prevent disbonding of the laminate layer from the fabric.

Since the coating on the second set fibres can be selected to be compatible with that of the heat recoverable fibres and the second polymeric material applied to the fabric, the bond between the fibres and the applied polymeric material is independent of the core material of the coated fibres. This enables materials to be used for the core of the coated fibres which would, if uncoated, be incompatible with the second polymeric material which is applied to the fabric. This gives a wide range of combinations of materials that can be used.

Examples of materials that can be used for the second polymeric material which is applied to the fabric and also for the polymeric coating which is applied to the first set of fibres include thermoplastic and elastomeric materials. Examples of suitable thermoplastic materials include ethylene/vinyl acetate copolymers, ethylene/ethyl acrylate copolymers, polyethylenes including a linear low, low density and high density grates, polypropylene, polybutylene, polyesters, polyamides, polyetheramides, perfluoroethylene/ethylene copolymer and polyvinylidene fluoride. Examples of elastomeric materials include acrylonitrile butadiene styrene block co-polymer, acrylic elastomers including the acrylates and methacrylates and their copolymers, e.g. polybutyl acrylate, and poly 2-ethylhexyl acrylate, the high vinyl acetate copolymers with ethylene (VA-E's), polynorbornene, polyurethanes and silicone elastomers and the like.

The second polymeric material, and also the coating on the fibres can be cross-linked by irradiation or by other means such as chemical cross-linking using, for example, a peroxide cross-linking agent. It is particularly preferred to cross-link the polymeric materials if they comprise materials being a low melting point in their uncross-linked state. Where irradiation is used a dose of 10 megarads or less, in particular from 3-7 megarads, is preferred (for a material containing no antirads or prorads. Higher or lower doses being preferred for materials containing antirads or prorads respectively. The resulting extent of cross-linking allows the second polymeric material to recover with the fabric. It also prevents the second polymeric material, and the coating on the fibres running or dripping during heat recovery, especially during heat recovery by means of a torch. The recovery ratio of the article after irradiation is preferably at least 50% especially at least 70% of that before irradiation. These dose values may be regarded as typical for olefinic polymers such as polyethylene of low irradiation, and the skilled man will be able to select suitable dose values depending on the presence of various concentrations of prorads if any. The article may be produced using a single irradiation step if the beam response of all the polymeric materials present are compatible; the beam response of the heat recoverable fibres may, if desired, be increased by the addition of prorads and that of the polymeric coating on the second set of fibres and that of the second polymeric material reduced by the addition there of antirads. Otherwise separate cross-linking steps can be used. A preferred form of making the article comprises extruding and stretching the heat recoverable fibres, weaving those fibres with the coated fibres, applying the second polymeric material, preferably by applying a single laminate layer of a material containing antirad, and cross-linking the laminated article to a beam dose of 12 Mrads. A further feature of post-lamination cross-linking (particularly by irradiation) is that a cross-link bond may be formed between the recoverable fibres and/or any other fibres and/or the second polymeric material which can help to maintain the structure of the article, particularly under severe recovery conditions. This may allow a much less severe laminating process, since it can obviate the need for physical interlocking.

The polymeric coating on the fibres is non-conductive. Preferably it has a resistivity greater than $10^{10}$, more preferably greater than $10^{14}$ ohm.cm. It is particularly preferred that the second polymeric material has a high resistivity where there is only a single laminate layer on the outside of the fabric, and where the article is to be used for covering electrically conductive objects, where short circuits are to be avoided, and an electrically insulating inner surface of the article required.

The heat recoverable article according to the invention has a wide variety of uses. For example it may be recovered over substrates, especially substrates having varying or discontinuous contours, to provide mechanical protection or protection from the environment. The fabric may employ heat stable fibres having high tensile strengths, e.g. glass fibres or aramid fibres sold by Dupont under the trade name "Kevlar" which, if laid in the axial direction enable the article to be used for example as a pipe coupling, the high strength heat-stable fibres providing the article with a high pull-out resistance.

Depending on the application of the article, it can take any suitable shape. For example it may have a uniform cross-section along its length, or the shape and/or size of the cross-section may change along its length.

For some applications it is preferred to coat the article internally with an adhesive, preferably a heat activatable adhesive.

Embodiments of the present invention will now be described, by way of example, with reference to the accompanying drawings, wherein:

BRIEF DESCRIPTION OF THE DRAWINGS

FIG. 1 is a perspective view of an article according to the invention with the outer laminate layer partially cut away to reveal the underlying fabric.

FIG. 2 is a cross-section through the article of FIG. 1.

FIG. 3 is a cross-section through the article of FIGS. 1 and 2 recovered onto an object.

Referring to FIGS. 1 and 2, a tubular article 1 comprises a fabric layer 3 and an outer laminate layer 5 of low density polyethylene. The fabric layer 3 is 2×2 twill weave design a weave comprising a weft of heat shrinkable high density polyethylene fibres 7 extending around the circumference of the article and a warp of heat stable fibres 9 extending along the length of the article. The heat stable fibres 9 comprise a glass multifilament core 11 and are coated with a layer of low density polyethylene 13 (FIG. 2).

FiG. 3 shows the article of FIGS. 1 and 2 recovered onto an object 15. The outer laminate layer 5 and the coating 13 on the glass fibres 9 have melted and flowed between the fibres of the fabric. The fabric is in close conformity with the object 15.

The following are specific examples of articles according to the invention. In each case the article is in the form of a uniform tube having a diameter of 30 mm before recovery.

EXAMPLE 1

A plain weave fabric design was used. The fabric had the following material construction.

Warp (longitudinal) 68 tex multifilament glass coated with low density polyethylene having an overall text of 450 and an overall outer diameter of 0.7 mm.

Weft (circumferential) 60 tex monofilament high density polyethylene having a diameter of 0.30 mm.

Pick Rate = 13.9 × double insertions/inch

Number of warp ends = 84

The fabric was coated with 0.6 mm wall thickness polyethylene on the outside of the tube only, and the the article was irradiated to 12 MegaRads.

The article was found to have a recovery ratio of 3.0:1.

EXAMPLE 2

A 2×2 twill (Herringbone) design was used.

The materials were as for Example 1.
The Pick Rate (weft)=22.7×double insertions/inch
Number of warp ends=83

The fabric was coated with 0.6 mm wall thickness polyethylene on the outside of the tube only, and the the article was irradiated by a dose of 12 Megarad.

The article was found to have a recovery ratio of 3.5:1.

EXAMPLE 3

A 3×1 broken twill (4 end satin design) was used.
The materials were as for Example 1.
Pick Rate (weft)=37.5×double insertions/inch
Number of warp ends=71 ends.

The article was coated with 0.6 mm wall thickness polyethylene on the outside of the tube only, then irradiated by a dose of 12 Megarads.

The article was found to have a recovery ratio of 3.9:1.

What is claimed is:

1. A heat recoverable article comprising:
(a) a fabric cover comprising (i) a first set of fibres which are heat recoverable, and (ii) a second set of fibres which are multifilament fibres, at least some of which multifilament fibres are provided, individually, with a substantially continuous coating of a non-conductive polymeric material, and (b) a second polymeric material applied to the fabric, to render the article substantially impervious to the passage of liquid through the thickness of the article.

2. An article according to claim 1, in which the second set of fibres are heat-stable.

3. An article according to claim 2, in which the heat stable fibres comprise glass.

4. An article according to claim 1 in which the first set of fibres provide the weft of the fabric and the second set of fibres provide the warps of the fabric.

5. An article according to claim 1 which is in the form of a tubular sleeve.

6. An article according to claim 5, wherein the first set of fibres extend around the circumference of the tubular sleeve, and the second set of fibres extend along the length of the sleeve.

7. An article according to claim 1, in which the fabric comprises a weave, braid, or knit.

8. An article according to claim 1, in which at least one of the first set of fibres, the coating of the second set of fibres, and the second polymeric material comprise a polyolefin.

9. An article according to claim 1, in which the coating on the second set of fibres is compatible with, preferably the same as, the second polymeric material.

10. An article according to claim 1, in which second polymeric material is in the form of a layer or layers bonded to one or both major surfaces of the fabric.

11. An article according to claim 5, in which the second polymeric material is in the form of a single laminate layer applied to the outside of the tubular article.

12. An article according to claim 1, in which the second polymeric material is in the form of a matrix through which the fabric extends.

13. An article according to claim 10, in which the second polymeric material and/or the coating on the second set of fibres is cross-linked.

14. An article according to claim 1, in which the thickness of the polymeric coating on the second set of fibres is at least 0.05 mm.

15. An article according to claim 1, in which the sleeve has an internal coating of a heat activatable adhesive.

16. An article according to claim 1, in which the polymeric coating on the second set of fibres has a resistivity of at least $10^{10}$ ohm.cm.

17. An article according to claim 1, in which the recoverable fibres of the first set of fibres have a recovery stress of at least 1.5 MPa and preferably at most 5 MPa.

18. An article according to claim 1, having a uniform cross-section along its length.

19. An article according to claim 1, having a cross-section which changes in shape or area along its length.

20. An article according to claim 1, having a recovery ratio of between 1.1:1 and 6:1.

21. An article according to claim 1 made by (i) fabricating a fabric from a first set of fibres which are heat recoverable, and a second set of fibres which are multifilament fibres and at least some of which multifilament fibres are coated with a continuous layer of a non-conductive polymeric material and (ii) applying to the fabric sufficient amount of a second polymeric material to render the fabric substantially impervious to the passage of liquid through the thickness of the fabric.

22. A method of making an article according to claim 1, comprising (i) fabricating a fabric cover from a first set of fibres which are heat recoverable, and a second set of fibres which are multifilament fibres and at least some of which multifilament fibres are coated with a continuous layer of polymeric material and (ii) applying to the fabric sufficient amount of a second polymeric material to render the article substantially impervious to the passage of liquid through the thickness of the article.

* * * * *